May 24, 1949.   P. H. THOMAS   2,470,797
AEROGENERATOR
Filed April 19, 1946
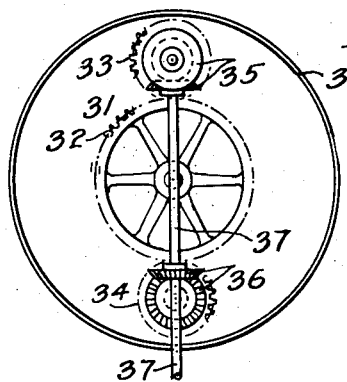
Fig.2
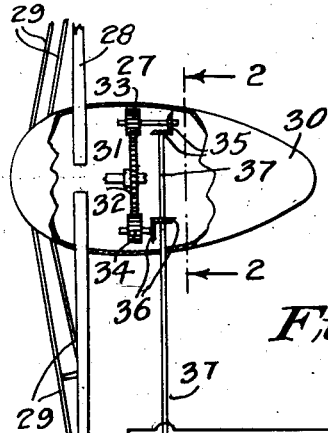
Fig.1.
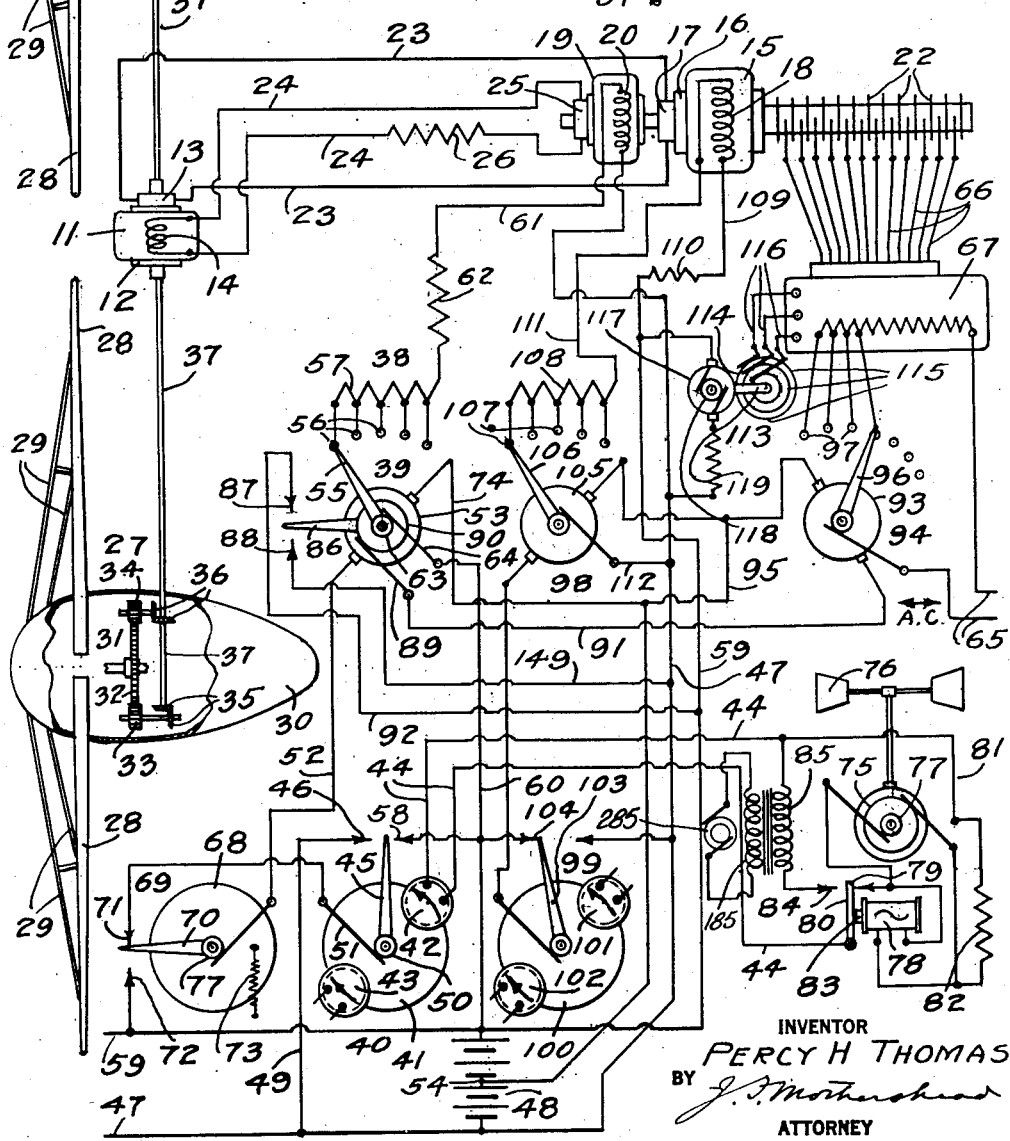
INVENTOR
PERCY H THOMAS
BY
ATTORNEY Patented May 24, 1949

2,470,797

UNITED STATES PATENT OFFICE 2,470,797

AEROGENERATOR

Percy H. Thomas, Washington, D. C., assignor to the United States of America as represented by the Chairman of the Federal Power Commission Application April 19, 1946, Serial No. 663,340

14 Claims. (Cl. 290—44)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to a system in which energy from the natural winds, as they blow, subject to hurricanes and calms, may be generated with maximum effectiveness and delivered for use in normal constant potential constant frequency alternating electric supply systems. My invention further contemplates an apparatus which will add to the stability of the receiving system, both as to the constancy of voltage and as to its resistance to sudden short circuits or abrupt load shocks, threatening loss of synchronism. On account of the multiple benefits to be secured, my system requires the combined use of a number of separate elements, most of which in themselves, individually, are known in the art.

I may point out that the energy content of any stress of wind varies as the cube of its velocity, so that wind turbine design must be closely adjusted to the known wind conditions. My turbine is of the open wheel fixed blade type, in which a few widely spaced, long and slender blades are revolved at relatively high speed. It has been determined that once such blades in a wind wheel have been given a definite shape and cross section, and have been set at a definite angle to the plane of rotation, there will be an optimum output with a wind of any particular velocity when the speed of rotation of the wheel bears a certain fixed relation to the wind velocity, over a wide range, and that the power generated by the wheel will fall off in any given wind whether the speed of the wheel be increased or decreased from the optimum. The difficulty of securing maximum output from such a turbine dependent upon the constantly varying natural velocity of the wind is obvious.

My invention further cares for the practical operating contingencies arising from destructive winds of hurricane force and, as far as my stabilizing effects are involved, for the natural impotence of the wind generator during calms.

I am aware that many inventors have worked on the general problem of utilization of wind energy for the supply of electric power and am familiar with many expedients that have been so devised, but as far as I am informed none has undertaken to secure the particular results that I have pointed out above, nor has any employed the same means.

When it has been desired to charge electric storage batteries by wind power, it has been found necessary to protect the generators and the batteries from excessive current when the wind rises to high velocities. The importance of this is seen when it is remembered that if the velocity of the wind rises to double that appropriate to full load, the energy available in the wind rises to eight times normal. Inventors have sometimes used centrifugal devices to automatically distort or feather or otherwise alter the configuration of the wind wheel so that the output is reduced below the dangerous point, or they have added automatic brakes to consume the surplus energy. My invention makes use of a different and novel principle which has marked advantages, as will be explained.

It is well known that when wind energy for this purpose is to be supplied to a constant frequency alternating system, the power must be delivered at that frequency, which requires constant speed operation of the delivering apparatus. Use has so far been made of a direct connected generator connected to the wind wheel for this purpose. But it is clear that for the wind wheel itself to be forced to operate at a constant speed for all wind velocities is not in the interest of maximum output, since the optimum velocity ratio can thus be secured at only one wind velocity. Apparently, to the present time, no way has been devised to avoid this loss of effectiveness.

Another unique feature of wind power, as used as an auxiliary supply of energy to constant potential alternating systems, requires mention, because it calls for special forms of control. Since wind energy cannot be stored it should be consumed in the quantities and at the time when it is extracted, while other generating apparatus and proper governors must be relied upon the supply system to maintain the frequency of the system. On the other hand the wind generating system must include the necessary means for protecting itself against overload and over-stress. The methods already described as in use with storage battery charging from wind power have been used for this purpose, notably the feathering of blades. These methods, however, do not serve the purpose of my invention; viz., to attain the maximum wind energy by adjusting the wind wheel speed to the optimum ratio to the wind velocity over the range of normal winds. Furthermore, my invention contemplates avoiding the dangerous effects of excessive wind power by the expedient of slowing down the speed of the wheel, without any mechanical change therein whatsoever. Such slowing down has the effect of purposely avoiding the optimum velocity ratio and thus greatly reducing the power generated. This method has the great advantage in operation of avoiding the mechanical weaknesses of feathering and braking mechanisms and the cost of these added features. Such gadgets are naturally a handicap.

While such drawbacks may be put up with in small power installations, they become almost insuperable in the very great diameter wheels involved (up to at least 200 feet in diameter) when large power units up to many thousand kilowatts capacity such as are contemplated in my invention are considered.

The effectiveness of my device for the purpose of reducing excess generation in the case of high winds may be seen, when it is considered that the thrust on the wheel in the direction of the wind and the power output vary as the sum of the squares of the wind velocity and the blade speed, taken as linear velocities. Since it is necessary to use values of wheel speed many times the wind velocity in such wind wheels, it is seen that a small reduction in the wheel speed will greatly reduce the total output. This law is more customarily expressed as the rule that the effective or "relative" velocity of the wind attacking a turbine blade is the square root of the sums of the squares of the wind velocity and the wheel speed. Further, that the pressure of the air on the blade varies as the square of the relative velocity. The pressure is further proportional to the angle of attack of the relative wind over a wide range of velocities. It is further necessary for this reduction in output due to reduced speed to overcome the tendency for increased output due to the increased angle of attack formed with increasing wind velocity at constant wheel speed; but since the angle of attack varies as the first power of the wind velocity and the reduction of thrust pressure varies as the square of the wheel speed, the advantage in my system is evident.

I have explained the customary operations in the art to which my invention relates at some length in the interests of understanding and to clarify the distinctions in my invention from the prior art. The other features of my invention relating to stabilization and related matters will be described in connection with the drawings.

In the drawings:

Figure 1 is a diagram showing my apparatus.

Figure 2 is a section on the line 2—2 of Figure 1.

Figure 1 shows the details of my apparatus more particularly directed toward maintaining proportionate operation between the wheel speed and the wind velocity over the normal operating range of wind velocity. I show a direct current generator 11 with its armature shown as 12, its commutator as 13, and its field coil as 14. As the construction of the generator forms no part of my present invention, it is not further illustrated. A synchronous converter 15, having an armature 16, a commutator 17, and a field coil 18 is shown with an exciter 19 driven directly from the converter, which has a field coil 20. I prefer to use a 12-phase converter with twelve slip rings as shown at 22. Leads 66 therefrom are shown, but my invention is not limited to any particular type of converter. Vacuum tubes may be substituted for the converter and arranged for conversion from direct to alternating current as is well known in the art. The leads 23 serve to connect the converter commutator 17 with the generator commutator 13, and the leads 24 connect the commutator 25 of the exciter 19 to the generator field 14, a general utility resistance 26 being connected in these leads. This exciter operates at constant speed since it is driven by the synchronous converter 15.

Two wind wheels 27 are used with my preferred wind generator, but two are not necessary for carrying out my invention. These particular wheels have each three blades 28, and bracing members 29, serving to support the blades against the very heavy aerodynamic stresses of operation and to keep the blade fixed in position. I prefer to provide a "fairing" or housing 30 over the hubs of these wheels to streamline the flow of air and protect the hub and bearings.

As a convenience in the drawings I have shown the wind wheels on a greatly reduced scale in proportion to the gear trains 31. As a matter of fact, all the gears are enclosed within the wheel housing; this in no way affects the elements of my present invention.

The power from the wheels is transmitted from the wind wheel to a main spur gear 32 and then to a pair of spur pinions 33, 34. Each of the outer spur pinions 33 drives a pair of bevel gears 35, as shown, and each of the inner spur gears 34 drives a pair of bevel gears 36, all four driven pinions being fast on a generator shaft 37. The generator armature 12 and the commutator 13 are shown as driven by the shaft 37. As these gear trains 31 merely act as mechanical links between the wind wheels and the generator and as their particular layout forms no part of my present invention, no further description is added here. A front view is shown in Figure 2.

It is seen that control of the field strength of the generator 11 is obtained by varying the strength of the field 20 of the exciter 19, which has the advantage that comparatively small currents are varied by an adjustable field resistance control 38. This expedient of using variations in the exciter field instead of the generator field is well known.

At 39 I show the circuits for governing the field strength of the generator to maintain the most favorable speed on the generator. A meter 40, including a wattmeter type rotating disc 41, is indicated, this disc moving under the resultant effect of current in the two coils 42 and 43 placed in operative relation to the disc 41. As such discs and the reaction of current coils upon them are well known, I give no further description of their construction here. The coil 42 is supplied through the leads 44 by any of the known means of deriving an alternating current proportional to the wind velocity. The coil 43 is supplied through any of the known means of supplying an alternating current proportional to the velocity of the wind wheel. In operation when the current in either coil predominates in its torque on the disc 41 over that of the other coil, the disc 41 turns in one direction or the other. If the wind velocity is too high for best operation, the current in the coil 42 will cause a greater torque in the direction of its arrow, on the disc 41 than the coil 43 and the arm 45 will move to the left and will make contact with the contact point 46. A circuit will then be complete from the bus 47, fed by the battery 48, through the conductor 49 to the contact point 46, to the arm 45, through the slip ring 50, to the brush 51, and the contact 71, the arm 70, the slip ring 77, the lead 52, the servo motor armature 53, and thence through the conductor 74 to the center connection 54 of the battery 48. As this servo motor 39 is a well-known expedient for operating current controlling means, it is not further described here, and only its armature 53 is illustrated. The movement of the servo motor 39 by the current flowing in this circuit causes an arm 55 to move over the resistance tap contacts 56 of a resistance 57, thus changing the strength of the current in the field coil 20 of the exciter 19, and hence the field strength of the generator. The direction of the torque of the coils 42 and 43 on the disc 41 and the direction of the current in the armature of the servo motor armature 53 are so chosen that an excess of velocity of the wind will cause an increase in the resistance 57 and a decrease in the field strength of the generator field coil 14 which will cause a lowering of the generator voltage which will decrease the flow of energy to the converter and permit the wind wheel to speed up. When the wind wheel speed has reached the selected ratio to the wind velocity, it will continue to increase until the torque of the coil 43 will predominate over that of the coil 42 and the arm 45 will move to the right and close a contact point 58. In this case a circuit is closed from a bus 59 through a conductor 60, to the contact point 58 and the arm 45, and thence as before, back to the center point 54 of the battery 48. The current in the servo motor armature 53 will then be reversed and the arm 55 will move in the opposite direction to increase the field current in the exciter coil 20 and increase the load on the generator 11, operating to slow down the wind wheel 27 until the proper ratio is again obtained. The system of circuits will thus cause a continuous series of swings of load up and down causing the wind wheel speed to alternate above and below the chosen ratio to the wind velocity, as with any governing system.

The operating circuit through the exciter field coil 20 is from the bus 47, through the coil 20, a conductor 61, a utility resistance 62, the resistance 57, the contacts 56, the arm 55, the slip ring 63, and brush 64, and the conductor 60 to the bus 59.

It may be explained that the voltage of the alternating receiving circuit 65 being maintained constant by suitable voltage regulators of the usual form in said circuit, will cause a constant alternating voltage on the low tension windings and leads 66 of the transformer 67. Acting through the synchronous converter 15 this constant alternating voltage will cause a corresponding constant direct current voltage on the commutator 17 of the converter. Energy can flow from the generator 11 to the receiving circuit only when the voltage of the generator is higher than this constant D. C. voltage established by the converter 15 from the receiving circuit. On the other hand, since the resistance of these circuits is low, a comparatively very small excess of generator voltage over the converter voltage will cause a large flow of energy. This is an important advantage of my invention for small changes in generator excitation, which can occur very quickly, will cause large corrective variations in the generator load, resulting in rapid adjustment of speed of wind wheel to variations in the wind velocity.

I have shown the receiving circuit, which comes from the utility system or other circuit which is being supplied, as single phase; it will be understood that such circuit will usually be three-phase and the single-phase form is shown to simplify the diagram.

I have now described the feature of my invention by which, during the existence of winds within the normal operative range, which is the range over which I maintain the chosen relation of wind velocity to wheel speed, the chosen ratio is maintained. As already pointed out, this permits the greatest feasible output from the particular content of the wind as it may blow at the moment. The less energy will be gotten from wheel speeds above or below the optimum results from the aerodynamic relations of the angle of attack to the lift and drag on an airfoil.

To describe the operation of my invention during those periods when the wind velocity is above the velocity corresponding to the upper limit of the normal operating range, reference is had to the wattmeter 69 where a rotating disc 68 constituting an element of a common alternating current induction type wattmeter 69 carries an arm 70 adapted to operate between contacts points 71 and 72.

The disc 68 is similar to the disc 41 and is of a well known type. As the wattmeter 69, of which it is a part, is known in the art, no further description is given. As a wattmeter disc, the part 70 turns to the contact point 72 when the watts output of the system exceeds a predetermined value, corresponding to the maximum permissible output of the apparatus. On less values of output the restoring spring 73 of the wattmeter pulls the arm 70 against the contact point 71, restoring the operation. I will point out that while I have described these circuits as protecting the wind generator against over-loads, it serves at the same time to protect the apparatus against any over-strain, due to the excessive wind, which is associated with the load, for example, the aerodynamic thrust on the blades, provided the suitable adjustment is made in the setting of the wattmeter disc 68.

Should now the wind rise to hurricane strength, endangering the physical structure, I bring the wind wheel to a stand-still, which has the effect of relieving the wheel of the aerodynamic thrust from the wind, which is a major factor in the total stress. No other relief is ordinarily required.

In order that my invention may include the feature of the continuous maintenance of the flywheel effect of the generator and the wind wheel, the transformer secondary 85 is made use of. This relates to the supply of current to the coil 42, operating on the disc 41—and traversed by a current proportional to the wind velocity. As here shown, this result is secured by the small windmill wheel 76 exposed to the same wind as the main wind wheels and driving a small magneto or other A. C. generator, whose slip rings are shown at 75, 77, which supplies alternating current to the coil 42 through the leads 44, 44. A relay coil 78 carries current from this A. C. generator, current from which normally passes through a contact point 79, cooperating with an arm 80 and the coil lead 44 to the coil 42 and back to the generator by the second coil lead 44 and a conductor 81. Since this windmill is designed to run free in the wind like a current meter in a stream of water, it will have a speed of rotation proportional to the wind velocity, and the A. C. generator driven therefrom will deliver a current proportional to the wind velocity provided the circuit of the A. C. generator and the coil 42 have an ohmic resistance well in excess of the circuit inductance. This result I attain by the insertion of the high resistance 82 in the circuit. The current in the coil 42 therefore meets the requirements of normal operation.

Supposing now that the wind velocity drops below the chosen minimum for the normal operative winds, the armature 83 lifting the arm 80 will drop and the arm 80 will contact with a contact point 84. The lifting power of the coil 78 is adjusted to pick up the armature 83 at a current just under that corresponding to the minimum normal operative value. The coil 42 is now excited by the transformer secondary 85, which in turn may be excited through its primary 185 in any of the known ways of exciting transformer secondaries but from a constant potential source 285. The coil 42 now exerts a constant torque on the disc 41 of Fig. 1 and the coil 43 will operate as before, and produce a constant speed on the wind wheel, at least as long as there is energy enough in the wind to do so. If a calm occurs, the wheel will slow down from lack of support until the voltage of the generator drops below that of the commutator 17 of the converter 15. When this happens energy will flow from the receiving circuit 65 to maintain the speed of the generator 11, which is now acting as a motor, appropriately to its field setting. As wind energy later builds up, the speed of the wind wheel 27 will increase until the voltage of the generator exceeds that of the converter 15 and energy from the wind will then be delivered (allowing for system losses).

A further feature of my invention remains to be described. In the interest of good generator design, I provide only a limited range of field adjustment for my D. C. generator 11, whose armature is identified as 12. However, to utilize as extended a range of proportional operation as possible, the range of voltage of the generator 11 should be far greater. I take advantage of the fact that the D. C. energy flowing is determined not by the absolute value of the generator voltage, but by its value relative to the converter voltage brought in through the transformer, to secure favorable operation. By putting taps in the leads of the transformer—I usually prefer the high tension leads—I may reduce the converter voltage by steps sufficiently small to meet the range of the generator field adjustments.

This is brought about by the apparatus, where 86 is an arm carried on the armature 53, cooperating with the contact points 87 and 88, while 89 is a brush and 90 is a slip ring serving to conduct current into the arm 86 from the conductor 91. The contact point 87 is connected with the bus 59 by a conductor 92. The conductor 91 connects with the armature 93 of a servo motor 94 which armature is also connected with the middle point 54 of the battery 48 by a conductor 95.

When the servo motor 39 has turned the arm 55 nearly to the limit of its operation on the resistance contacts 56, the arm 86 which is carried on the servo motor armature 53 contacts through the contact point 88 and a circuit is complete from the bus 47, conductor 169, the contact 88, the arm 86, the slip ring 90, the conductor 91, the armature 93, and the conductor 95 to the battery 48 at 54. This will cause the servo motor armature 93 to turn an arm 96, carried in the armature, to the next lower tap on the high-tension winding of the transformer 67. The taps 97 from this high-tension winding are shown at 97 as contact points for the arm 96. As the constructions required for providing taps to transformer windings and the contacts for adjustment arms are well understood, no further illustration is necessary. The effect of the lower tap on the transformer primary is to decrease the winding ratio of the transformer and to raise the voltage on the secondary and hence the D. C. voltage of the converter brushes. This causes a reduction of load on the generator 11 and tends to speed up the wind wheel 27, which was at too low a speed. But, as this step in voltage was a large one, being a tap on the transformer winding, the gain in speed of the wheel will be too great for equilibrium and the field resistance of the generator exciter will be reduced automatically by the operation already described. The apparatus is then ready for further wind velocity changes.

My gear train 31 is diagrammatically shown in the sectional view Figure 2, but because the mechanical form of these gears is not part of my invention and as such gear trains are well understood, I have not added further description.

In practical operation starting with a steady wind blowing at normal rated capacity, the maximum velocity at which the wind wheel has sufficient strength and the generator sufficient capacity, it may be assumed that the wheel has attained its normal full speed and that the wind generator is delivering its full power to the supply system. Now should the voltage on the high tension leads of the transformer tend to become too high due to an unexpected low line drop in the circuit connecting with the main supply system, or due to other causes, the converter through a well known action will automatically supply an out-of-phase corrective current to the line, and vice versa. As that action is well known, no further explanation will be given.

Should a dangerously heavy load suddenly appear on the line at a nearby point, this will tend to drop the line voltage and to slow down all generating apparatus in the system. As is well known, it is very necessary in such cases to support the line voltage and to prevent too rapid a slow-down of the system as a whole, to prevent loss of synchronism, the support being necessary until the circuit breakers have time to cut off the heavy load, usually a matter of a few cycles. In this operation my apparatus has unique advantages. The converter plays its usual part in supporting voltage as just explained and further has an extraordinary ability to keep in synchronism with the supply circuit since it has relatively small fly wheel capacity and does not experience any slow-down torque due to the energy passing through it from the prime mover. This is a unique characteristic of the rotary as contrasted with the generator.

Further my D. C. generator and wind wheel with naturally very large fly wheel capacity, supply energy to the overloaded system from their stored energy with no possibility of dropping out of step on account of the unique features of my invention, by which the generator power is delivered non-synchronously. Again, when a 3-phase generator connected to an alternating system is faced with such a sudden overload, it will endeavor to deliver such energy as it can from its fly-wheel capacity, but this will be limited to the amount of energy that it can give up without dropping out of synchronism. No such limitation exists in my system where the wind wheel can decrease its speed to deliver fly wheel energy without any limit of synchronism, since the delivery of power in a direct current circuit depends only upon voltage conditions.

Suppose that with operating conditions normal at full rated load, the wind velocity drops 20%. The coil 43 in the control device 50 will then have a heavier torque than the coil 42 and the arm 45 will move to the right. As already explained, this will strengthen the generator field and increase the load in the generator and slow it down below the proportional speed, causing in turn a reverse swing, all as already explained. As the wind varies up and down as it normally does these actions will be more or less continuous but the wind wheel speed will never be far behind the wind velocity.

Should the wind increase beyond the velocity at rated load, however, the first effect will be to increase the load on the generator beyond its rated value and the wattmeter disc 68 will turn the arm 70 against the contact 72. This will have the effect of keeping the servo motor 39 continuously operating until the increased load has decreased the speed of the wheel below its rated speed so far that the load on the generator 11 is below normal full load, in which case the torque on the disc 68 is reduced and the arm 70 restored to the contact point 71 and normal proportional operation is restored. This provides full load output during very nearly all periods of high winds, regardless of the excess energy in the wind and this is accomplished by slowing down the wheel below maximum load normal speed sufficiently to overcome the excess torque that would naturally be produced by the excessive angle of attack of the high velocity wind. No complications are required in the wind wheel itself, a most important advantage.

Considering the case of insufficient wind or a calm, the operator may of course shut down his wheel to save station losses, but he then loses the stabilizing and regulating support of the converter and the fly wheel effect of the wind wheel. In the systems of the prior art, if he must have such support he is faced with the great station losses in the wind wheel and electrical apparatus in operating at full voltage and full speed. These would be excessive, especially aerodynamic losses in the wind wheel. The station operator is in a dilemma since the calm may well come at the busiest time of the day.

With my invention, when the wind velocity drops below a chosen minimum value, which is far below the rated value, the arm 80 drops and the coil 42 is supplied with a constant current of low value, so that the coil 43 and the disc 41 maintain this selected low velocity, drawing energy from the supply system as may be necessary to supplement the meagre wind energy, to keep the wheel turning.

With this lowered speed less than half the full load speed and the voltages both alternating and direct (except the voltage on the high tension winding) correspondingly reduced, the losses will be reduced at a much greater ratio, since most of them, such as windage and resistance losses vary as the square, while induction losses vary at a relative high power. The load on the system goes down as the cube of the wind velocity so that current flow in the armature windings is reduced to a very low value. Still, in case of variation of high tension voltage or a heavy overload, the voltage regulation and fly wheel reserve are still available, although the fly wheel energy will be reduced in magnitude. It may be added that, over the normal operating range of wind velocities, constituting the greater proportion, the greatest practical portion of the available wind energy is extracted on account of the constant angle of atack of the relative wind on the wind wheel blade, while with the prior art systems delivering power at constant synchronous speed, the extracted portions of the available power in the wind drops very rapidly when the wind velocity gets beyond a few percent below its value appropriate to synchronous speed.

Considering the operation by which the voltage regulating power of the converter is applied, a device 98 serves to prevent excessive demands upon the converter for out-of-phase voltage correcting current. 99 is a meter for measuring out-of-phase kv.-a. reactive or r. v. a., of a well-known type, having a disc 100, the current coil 101, the voltage coil 102, and a contacting arm 103. In the case of excessive leading current the arm 103 is urged against a contact point 104, as shown, completing a circuit through a servo motor 105 and causing an arm 106 to move over the contact points 107 of a converter field control resistance 108 and vice versa for lagging currents. The mechanical operation of the elements 99 and 98 are not further described since they correspond to the elements 40 and 39. The field coil 18 of the converter 15 is fed from the buses 47 and 59 through a conductor 109, the utility resistance 110, the conductor 111, the resistance 108, the arm 106 and a conductor 112.

In this operation the voltage correcting effect of the converter field is automatic, up or down as the situation may require, as is well known, but the rotary is sensitive to excessive corrective currents so that the protective devices 99 and 98 have been introduced.

I supply the buses 47 and 59 and the battery 48 with direct current through a motor generator set 113, having a three-phase synchronous motor 114, whose collector rings 115 are fed from the transformer 67 by leads 116. The direct current generator 117 of the motor generator set 113, whose armature is shown at 118, is driven from the motor by a shaft 119. As the charging of batteries or buses by such motor generators sets is well understood, I show no further illustration. I will point out that the motor must operate at constant speed but on voltage varying over a considerable range. This is feasible since the load on the motor may be materially reduced when the voltage is low since the field current supplied from the buses will normally be lower at such times.

It is understood that many of the elements shown may be replaced by others having all or part of the same functions, without departing from my invention.

I claim:

1. A direct current generator driven by a fixed blade wind wheel and constructed with a maximum safe operating limit corresponding to a prescribed wind velocity and wheel speed, an alternating power system, means for passing energy between said generator and said power system; control means operating on said generator to continuously increase the generator output as long as the speed of said generator exceeds a critical speed at which the wind velocity bears a prescribed ratio to the wheel speed, and for reducing the said output as long as the generator speed is less than said critical value, additional means for deenergizing said control means when the generator output exceeds said prescribed maximum limit and means, brought into action by said additional means, operative as long as the generator output exceeds said maximum limit, to increase the generator field charge to the point where the output falls below said maximum limit.

2. The system of claim 1 in combination with supplemental means operating to increase the generator field charge when the speed of the generator exceeds a minimum value and to decrease the generator field charge when the generator speed drops below this value, whereby the power circuit may make up deficiency in the wind energy together with means for de-energizing other control means when the wind velocity falls below a predetermined minimum value.

3. The combination of an alternating power receiving system, a wind wheel, a direct current generator connected thereto, a synchronous converter connected between said generator and said system, said converter acting as an electrical system stabilizer and said wheel and generator acting as a dynamic stabilizer and means for maintaining operation of said stabilizers during times of deficient wind, and for minimizing machine and other losses in operation, consisting of means for lowering the voltage of said converter, the load on said generator and the speed of said wheel, whereby said generator is enabled to maintain said stabilizing functions during the continuance of said deficient wind.

4. In combination, an alternating current power receiving system, a variable speed fixed blade wind wheel with driven generator, characterized by large fly wheel capacity, said generator having a maximum rated output and its maximum effectiveness with a fixed ratio between the wind velocity and the wheel speed, synchronously operating means for delivering energy from said generator to said power circuit, said last named means having the voltage supporting capacity characteristic of synchronous apparatus, a master controller operating through the field of said generator to maintain said fixed ratio between the wind velocity and the wheel speed, supplemental control operative when the output of the generator is above said rated output, to increase the generator field charge until the output drops below the maximum rating, said supplemental control de-energizing said master control means, and cooperative means operative on wind velocities below a prescribed minimum, for maintaining a constant wheel speed at a value below those of the normal operative range, and permitting energy from the power circuit to supplement inadequate wind energy to maintain said prescribed minimum wheel speed.

5. In a system of electric distribution in which wind energy is supplied to a constant potential alternating power supply system, subjected to line voltage disturbances and dangerous overloading, a fixed blade variable speed wind generator characterized by fly wheel capacity, a synchronous type conversion device with a separately excited field, for passing energy from the wind generator to the power circuit, constituting a system adapted to sustain the power system in case of line voltage or overloading difficulties, and means for reducing the operating losses in the wind generator and the conversion means at times of low wind velocities, including cooperating means for automatically reducing the voltage of the wind generator and the conversion means and for reducing the speed of the wind generator, during the continuance of said low wind velocities.

6. In combination, an alternating constant potential supply system, a fixed blade wind wheel, adapted to operate at varying speeds according to the natural changes in wind velocity, a direct current generator connected thereto, said wind wheel and generator having a limited range of wind velocity for normal operation, and having a maximum output beyond which the safety of the apparatus is endangered, means for maintaining a predetermined ratio between the wind velocity and the wheel speed on winds within said normal operating range and means actuated by output greater than said safe limit, due to winds above said normal range, for increasing the field charge of said generator to increase the output and reduce the speed of the wheel below that corresponding to the maximum of the normal range to the speed at which the power increasing action of the increased angle of attack of the higher than normal wind is neutralized by the power reducing action of the lower wheel speed.

7. In a system of distribution in which energy from natural varying winds is extracted and delivered to a constant voltage alternating supply system, the combination of a fixed blade wind wheel operable at varying speed, an electric generator driven thereby, having a prescribed maximum capacity and speed at a specified wind velocity, means for maintaining the velocity of said wheel proportional to the wind velocity on winds below the velocity at maximum capacity and adjustable means for reducing the speed of said turbine below that appropriate to the maximum capacity on winds higher than said velocity at maximum capacity, said means operating upon the field of said generator.

8. In a system of electrical distribution, a fixed blade wind generator, having a maximum limiting operation at a prescribed wind velocity, a constant potential alternating supply circuit, means for transferring energy from said generator to said supply circuit, a master controller responding to wind velocity, cooperating corrective control means for said master controller, operative with wind velocities below that of the limiting operation of the generator whenever the generator speed departs from a prescribed ratio with the wind velocity and supplementary cooperating corrective control means, dominating when the generator operation is above said limiting operation, said last named means operating to increase the generator field to reduce the generator speed below that corresponding to prescribed wind velocity, whereby the effect of the higher angle of attack is overcome.

9. A constant potential alternating electric supply system, a variable speed fixed blade wind generator, said generator being provided with a voltage regulating field circuit, means for feeding electric energy from said wind generator into said supply system, a master instrument responding to the velocity of the wind, corrective means cooperating with said instrument, operating on said field circuit, adapted to lower the natural voltage of the generator when the speed of the generator falls below a prescribed ratio to the wind velocity and to raise the voltage when said speed rises above said ratio, and a second corrective means, cooperating with said instrument operating on said field circuit, adapted to raise the natural generator voltage as long as the output of the generator exceeds a point of safe operation, together with means for de-energizing the first mentioned corrective means while the output exceeds said point of safe operation.

10. In combination, an alternating power supply system adapted to receive energy from the wind, a fixed blade, variable speed wind wheel, a nonsynchronous type generator directly connected thereto, means for transmitting energy generated to said supply system, said means including a synchronously running device, and means for controlling the amount of energy delivered from said generator to said supply system, in combination with cooperating means for maintaining a constant angle of attack for the resultant wind on the blades of said wind wheel over the normal operative range of wind velocities, and means, operating through said control means for reducing the speed of the wind wheel on the occurrence of unsafe operating conditions beyond the normal operative range whereby the operation is reduced to the safe value.

11. In a system of distribution in which the object is to abstract from the natural winds as they blow, the maximum available amount of energy and to deliver this to an alternating constant potential power system and in which reliance is placed upon the wind energy developing station for support for the line voltage of the power system and for fly wheel aid in the case of heavy overloading, the combination of a variable speed, fixed blade wind wheel, a direct current generator directly connected thereto, a field circuit therefor, a synchronous converter, a step-up transformer, taps and tap changing mechanism for said transformer, said transformer windings being connected to the slip rings of said converter, direct current mains connecting said generator with the commutator brushes of said converter, and control means operating on said generator field to raise the field charge to increase the load on the generator and so reduce its speed and to lower the field charge on said generator to reduce its load and increase its speed, together with means responsive both to the wind velocity and the wheel speed and operating upon said control means for maintaining a constant angle of attack for the wind on said fixed wheel blades over a normal operating range.

12. In the system of claim 11, the combination with a relay sensitive to excess loading on the wind station apparatus and adapted to interrupt the control means for maintaining a constant angle of attack and means cooperating with the control means and operating on the field charge, acting to increase the field charge as long as said relay is operative.

13. In combination, a constant potential alternating supply system, operating as a receiving circuit, a variable speed, fixed blade wind wheel, a generator connected thereto, means for transferring energy from said generator to said circuit and means for maintaining a constant angle of attack between said fixed blades and the relative wind, as the actual wind velocity varies over a working range, together with dominating means operative only with wind velocities exceeding said working range for reducing the speed of rotation of said wheel below the speed of rotation at the maximum of the working range, thereby compensating for the increased angle of attack due to excessive wind velocity.

14. In the system of claim 13, the combination with dominating means operative only when the wind velocity drops below the working range for maintaining the speed of rotation of the wheel at a predetermined value.

PERCY H. THOMAS.

REFERENCES CITED

The following references are of record in the file of this patent:

UNITED STATES PATENTS

| Number | Name | Date |
| --- | --- | --- |
| 1,114,759 | Heyroth | Oct. 27, 1914 |
| 1,142,538 | Snee et al. | June 8, 1915 |
| 1,778,793 | Constantin | Oct. 21, 1930 |
| 2,106,557 | Putnam | Jan. 25, 1938 |
| 2,148,804 | Claytor | Feb. 28, 1939 |
| 2,152,576 | Weeks | Mar. 28, 1939 |
| 2,178,679 | Claytor | Nov. 7, 1939 |
| 2,284,649 | Grabau | June 2, 1942 |
| 2,356,397 | Grabau | Aug. 22, 1944 |
| 2,360,792 | Putnam | Oct. 17, 1944 |
| 2,383,669 | Moore | Aug. 28, 1945 |

FOREIGN PATENTS

| Number | Country | Date |
| --- | --- | --- |
| 27,895 | Australia | July 18, 1930 |
| 229,290 | Great Britain | Apr. 29, 1926 |
| 482,329 | Great Britain | Mar. 28, 1938 |
| 502,417 | Great Britain | Mar. 6, 1939 |